United States Patent
Betti

(10) Patent No.: US 9,561,619 B2
(45) Date of Patent: Feb. 7, 2017

(54) ULTRASONIC SEALING DEVICE

(71) Applicant: I.M.A. INDUSTRIA MACCHINE AUTOMATICHE S.P.A., Ozzano Dell'Emilia (Bologna) (IT)

(72) Inventor: Cristian Betti, Imola (IT)

(73) Assignee: I.M.A. INDUSTRIA MACCHINE AUTOMATICHE S.P.A., Ozzano Dell'Emilia (IT)

( * ) Notice: Subject to any disclaimer, the term of this patent is extended or adjusted under 35 U.S.C. 154(b) by 0 days.

(21) Appl. No.: 14/787,841

(22) PCT Filed: Jul. 11, 2014

(86) PCT No.: PCT/IB2014/063029
§ 371 (c)(1),
(2) Date: Oct. 29, 2015

(87) PCT Pub. No.: WO2015/011597
PCT Pub. Date: Jan. 29, 2015

(65) Prior Publication Data
US 2016/0121541 A1    May 5, 2016

(30) Foreign Application Priority Data

Jul. 23, 2013 (IT) .............................. BO2013A0393

(51) Int. Cl.
*B32B 37/00* (2006.01)
*B29C 65/08* (2006.01)
*B29C 65/00* (2006.01)

(52) U.S. Cl.
CPC ............. *B29C 65/08* (2013.01); *B29C 65/087* (2013.01); *B29C 66/1122* (2013.01);
(Continued)

(58) Field of Classification Search
CPC .... B29C 65/08; B29C 65/087; B29C 66/1122; B29C 66/81427; B29C 66/81431; B29C 66/83413
(Continued)

(56) References Cited

U.S. PATENT DOCUMENTS 4,402,115 A    9/1983 Moertel
4,975,133 A *  12/1990 Gochermann ....... B23K 20/103
                                           156/580.2
(Continued)

FOREIGN PATENT DOCUMENTS

FR    2 677 049 A1    12/1992
GB    2 081 805 A      2/1982
(Continued)

*Primary Examiner* — James Sells
(74) *Attorney, Agent, or Firm* — Pearne & Gordon LLP

(57) ABSTRACT

Described is an ultrasonic device for sealing material (1) in strips, comprising: a generator (9) of electrical power signals; a converter (9a) for converting the electrical power signals into mechanical vibrations; a sonotrode (2) rotating about a first axis (X2); an anvil (4) rotating about a second axis (X4) parallel to the first axis (X2); the sonotrode (2) having a circular groove (6) and the anvil (4) having a protruding element (7) which is annular in shape; the protruding element (7) is configured to operate in conjunction with the groove (6) along directions parallel to the first axis (X2) and to the second axis (X4) in such a way as to seal the sheet or strip of material (1) moved along a direction (A) transversal to the first (X2) and second (X4) axis of rotation and passing between the sonotrode (2) and the anvil (4) engaging the groove (6) and the protruding element (7).

12 Claims, 4 Drawing Sheets

(52) U.S. Cl.
CPC .. *B29C 66/73921* (2013.01); *B29C 66/81427* (2013.01); *B29C 66/81431* (2013.01); *B29C 66/83413* (2013.01); *B29C 66/81417* (2013.01); *B29C 66/81419* (2013.01); *B29C 66/81422* (2013.01)

(58) Field of Classification Search
USPC .............................. 156/73.1, 580.1, 580.2
See application file for complete search history.

(56) References Cited

U.S. PATENT DOCUMENTS

| | | | |
|---|---|---|---|
| 7,204,899 B2 * | 4/2007 | Van Eperen | A61F 13/15723 156/269 |
| 2012/0012258 A1 | 1/2012 | Vogler | |

FOREIGN PATENT DOCUMENTS

| | | |
|---|---|---|
| JP | H02 277620 A | 11/1990 |
| WO | 2004/091894 A1 | 10/2004 |

\* cited by examiner

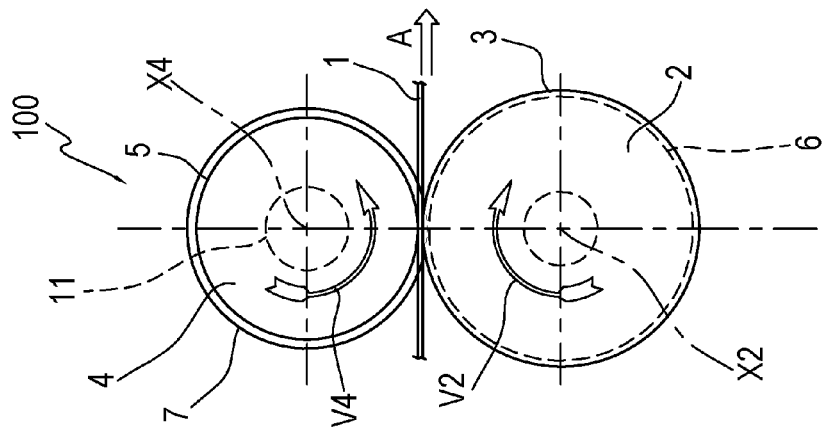
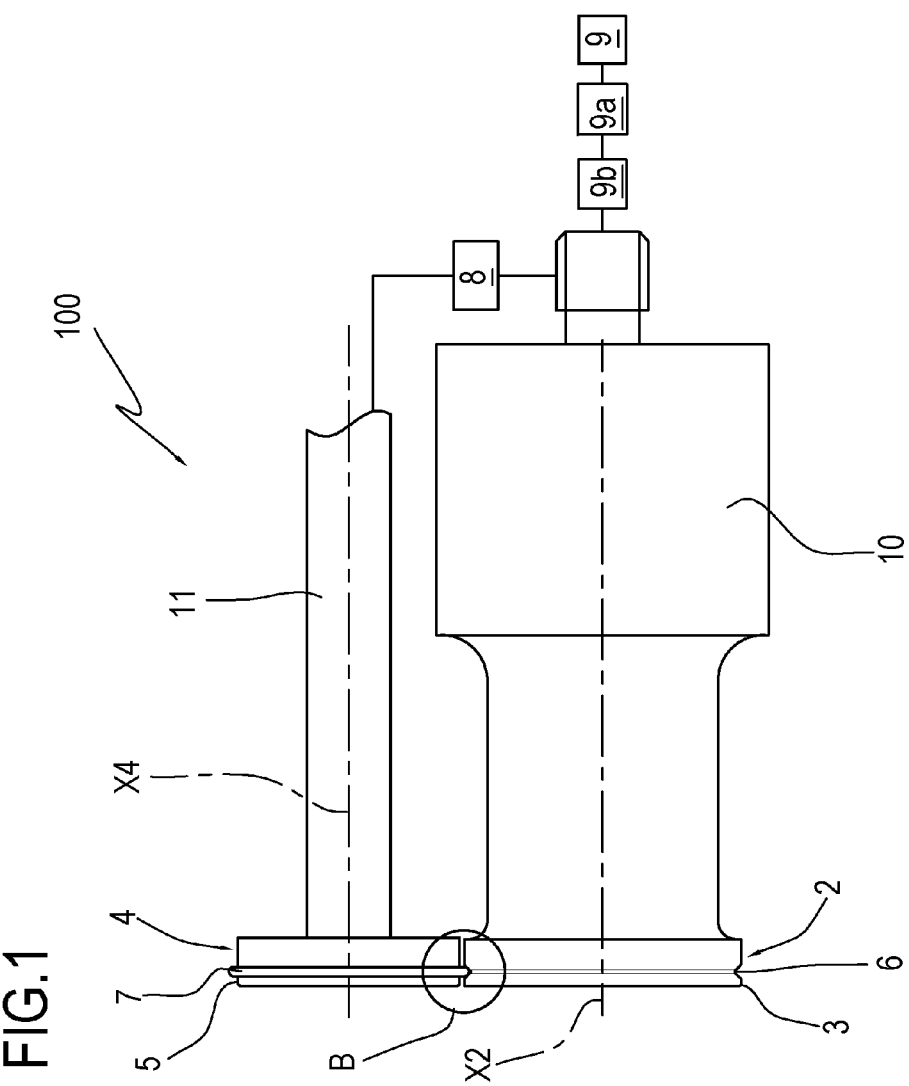

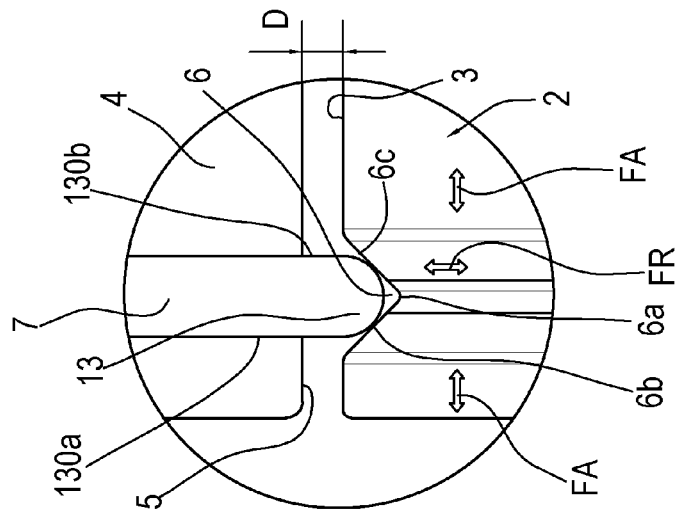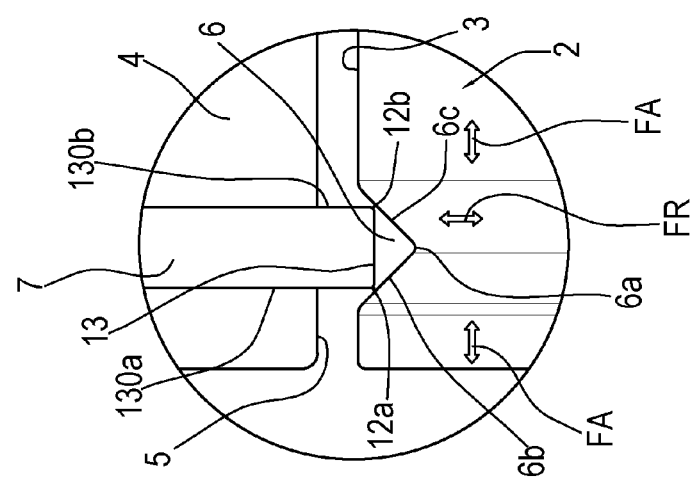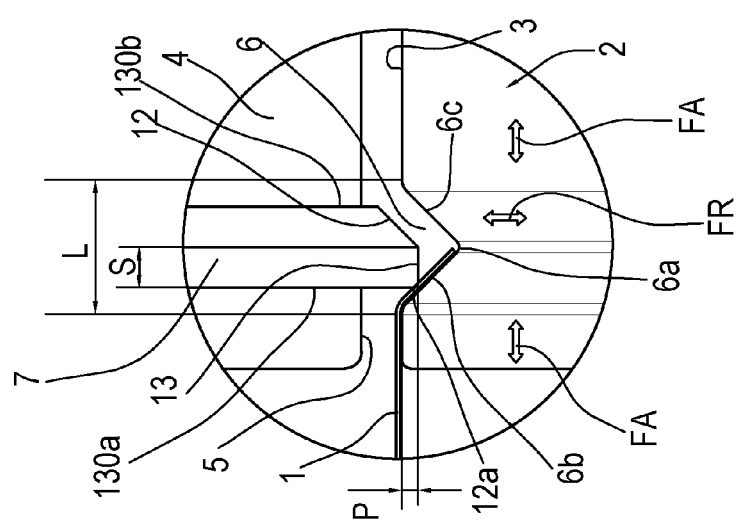

ULTRASONIC SEALING DEVICE

TECHNICAL FIELD

This invention relates to an ultrasonic sealing device used in particular for sealing material sheets or strips.

BACKGROUND ART

In the technical field of sealing devices, the prior art teaches the use of ultrasonic sealing devices, as this type of technology allows a precise and "cold" processing of the materials, such as, for example, the sealing of edges on thermoplastic films.

An ultrasonic sealing device comprises:
- a generator of electrical power signals with frequencies generally between 20 and 50 kHz;
- a converter which converts the electrical power signals into mechanical vibrations of equal frequency and defined amplitude;
- an amplifier (optional) or booster, which increases the amplitude of the mechanical vibrations,
- a sonotrode which transmits the mechanical vibrations to the material to be sealed; and
- a anvil which operates as a contact element for the material to be sealed and the sonotrode.

In practice, the heat sonotrode transmits energy by contact to the material to be sealed, which, by melting, is sealed.

There are two prior art types of sealing devices: the so-called "heat-sinking" devices, in which the sonotrode is movable in an alternating fashion along a single direction towards, and away from, the material to be sealed, and the anvil is stationary, or rotary; and the rotary sealing devices in which both the sonotrode and the anvil rotate, generally continuously about mutually parallel axes of rotation.

An example of sealing devices of the heat-sinking type is shown in patent WO 2004/091894.

An example of sealing devices of the rotary type is shown in patent US 2012/0012258.

In the heat-sinking sealing devices, the material to be sealed is generally moved intermittently, that is, it is positioned stationary between anvil and sonotrode during the sealing, and away from anvil and sonotrode once the sealing has been completed. The productivity of these sealing devices is generally limited.

Alternatively, the material to be sealed can also be moved continuously, thus increasing the productivity, but the high level of friction between the material and the sonotrode and the anvil has an adverse affect on the quality of the sealing, creating creases on the material and dissipating considerable quantities of energy.

The rotary sealing devices overcome the problems of friction of the heat-sinking sealers, but they have further drawbacks of an energy nature, because only a minimum part of the energy supplied to the sonotrode is actually used for sealing.

In effect, in the rotary sealing devices, the sonotrode vibrates axially along the respective axis of rotation and radially along radial directions perpendicular to the axis of rotation.

Only the radial vibrations, which correspond to approximately a quarter of the total energy supplied to the sonotrode, are used for sealing. The axial vibrations of the sonotrode are not used and, consequently, the corresponding energy (equal to approximately three-quarters of the total energy supplied to the sonotrode) is lost.

DISCLOSURE OF THE INVENTION

The aim of this invention is to provide an ultrasonic sealing device used, in particular, for sealing material in the form of strips, which overcomes the above mentioned drawbacks of the prior art.

More specifically, the aim of this invention is to provide a high energy efficiency ultrasonic sealing device, with reduced operating costs and able to make high quality seals, advantageously on materials in sheets or strips.

These aims are fully achieved by the ultrasonic sealing device according to the invention as characterised in the appended claims.

More specifically, the ultrasonic sealing device, for advantageously sealing material in strips, comprises a generator of electrical power signals; a converter for converting the electrical power into mechanical vibrations; a sonotrode rotating about a first axis and having a first peripheral surface; and a anvil rotating about a second axis parallel to the first axis and having a second peripheral surface.

According to the invention, one between the first peripheral surface and the second peripheral surface has a groove. Advantageously, the groove is circular. More advantageously, the groove is continuous. Alternatively, the groove is discontinuous.

Also according to the invention, the other between the first peripheral surface and the second peripheral surface has a protruding element.

Advantageously, the protruding element is continuous; alternatively, the protruding element is discontinuous or, in other words, it is made up of at least two consecutive curved components. A discontinuous protruding element is designed to couple both with a continuous groove and a discontinuous groove having corresponding discontinuities.

Also according to the invention, the protruding element is configured to operate in conjunction with the groove at least axially, that is, at least along directions parallel to the first axis and second axis, in such a way as to seal the material in strips, moved along a direction transversal to the first and second axes of rotation, and passing between sonotrode and anvil, engaging the groove and the protruding element.

Advantageously, the protruding element engages the groove for a predetermined depth.

This combined architecture of groove and protruding element makes it possible to use the vibrations generated by the sonotrode along axes parallel to the axis of rotation of the sonotrode for sealing the material: in particular, therefore, the vibrations generated axially along the sonotrode are used, at least partly, to obtain the sealing of the material being fed and interposed between sonotrode and anvil.

This feature makes it possible to use to the main part of the vibrations of the sonotrode, that is, the axial vibrations, to perform the sealing.

It should be noted, however, that the groove—protruding element structure also makes it possible to use the radial vibrations as the secondary sealing effect.

The presence of the protruding element inside the groove makes it possible to obtain a precise and stable positioning of the material in the sealing zone combined with a high capacity and speed of sealing of the material in the desired point or zone.

BRIEF DESCRIPTION OF THE DRAWINGS

The invention is described below with reference to the accompanying drawings, which illustrate a non-limiting embodiment of it, and in which:

FIG. 1 illustrates a schematic side view, with some parts cut away to better illustrate others, of an ultrasonic sealing device, used in particular on material in the form of strips, according to a first preferred embodiment of the invention;

FIG. 2 illustrates a front view of the ultrasonic sealing device of FIG. 1;

FIGS. 5 to 10 illustrate a detail B referring to FIG. 1 showing corresponding alternative embodiments of a sonotrode and an anvil.

DETAILED DESCRIPTION OF PREFERRED EMBODIMENTS OF THE INVENTION

Figure 4:
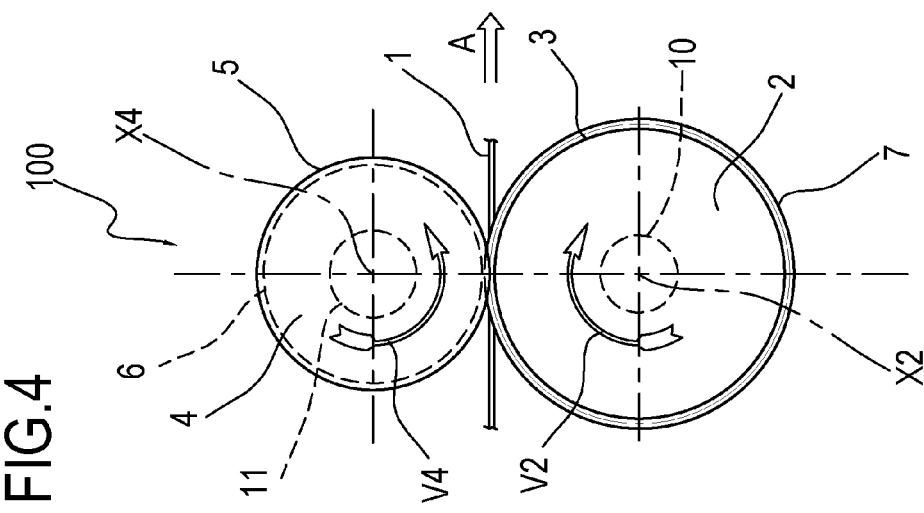
FIG. 4 illustrates a front view of the ultrasonic sealing device of FIG. 3.

FIGS. 1 and 2 illustrates an ultrasonic sealing device 100 according to a first preferred embodiment of the invention, for advantageously sealing a strip or sheet of material 1, comprising a generator 9 of electrical power signals, a converter 9a for converting the electrical power signals into mechanical vibrations, a sonotrode 2 and an anvil 4.

Optionally, the device 100 can comprise an amplifier 9b for amplifying the mechanical vibrations coming from the converter 9a.

More in detail, the generator 9 of electrical power signals is connected to the converter 9a, which in turn is connected to the amplifier 9b if present (as in the embodiment illustrated in FIG. 1), the latter being connected to the sonotrode 2. If the amplifier 9b were not present, the converter 9a would be directly connected to the sonotrode 2.

The sonotrode 2 is rotatable about a first axis X2 and has a first outer peripheral surface 3 (emitter).

The sonotrode 2 receives from the amplifier 9b mainly axial vibrations FA, that is, vibrations with the direction of vibration parallel to the first axis X2, and, secondarily, radial vibrations FR, that is, vibrations with the direction of vibration transversal to the first axis X2. In other words, therefore, the sonotrode 2 vibrates axially along the first axis X2 with axial vibrations FA and radially perpendicularly to the first axis X2 with radial vibrations FR.

The sonotrode 2 comprises a first shaft 10 which defines the first peripheral surface 3. More specifically, the first peripheral surface 3 is identified by at least one portion of outer lateral cylindrical shell extending around the first axis X2.

Advantageously, the first shaft 10 has sections on planes transversal to the first axis X2 which are circular in shape, which can have a radius variable along the first axis X2.

The anvil 4 rotates about a second axis X4, parallel to the first axis X2, and has a second outer peripheral surface 5.

The anvil 4 comprises a second shaft 11 which defines the second peripheral surface 5. More specifically, the second peripheral surface 5 is identified by at least one portion of outer lateral cylindrical shell extending around the second axis X4.

Advantageously, the second shaft 11 has sections on planes transversal to the second axis X4 which are circular in shape, which can have a radius variable along the first axis X4.

The sonotrode 2 is connected to a drive unit, which rotates the sonotrode 2 about the first axis X2.

The anvil 4 is connected to a further drive unit, which rotates the anvil 4 about the second axis X4.

Preferably, the sonotrode 2 and the anvil 4 (that is to say, the first shaft 10 and the second shaft 11) are connected to a single drive unit 8 (as in the embodiments illustrated in FIGS. 1 and 3) for being mutually rotated in a synchronised fashion. It should be noted that the sonotrode 2 and the anvil 4 have directions of rotation V2 and V4 which are opposite to each other.

It should also be noted that the first outer peripheral surface 3 and the second outer peripheral surface 5 have a zone of minimum tangential distance from one another which defines a sealing operating zone.

With reference to the first preferred embodiment shown in FIGS. 1 and 2, the sonotrode 2 comprises a circular groove 6 made on the first peripheral surface 3, whilst the anvil 4 has a protruding element 7 associated with the second peripheral surface 5. The protruding element 7 advantageously has an annular shape.

According to the invention, the protruding element 7 is configured to operate in conjunction with the groove 6 at least axially, that is, along directions parallel to the first axis X2 and second axis X4, in such a way as to seal the material 1 in strips, moved along a direction A transversal to the first and second axes of rotation X2 and X4 and passing between sonotrode 2 and anvil 4, engaging the groove and the protruding element 7.

It should be noted that the groove 6 and the protruding element 7 are configured and sized for a mutual respective penetration (in use) in the zone of minimum tangential distance from one another of the first outer peripheral surface 3 and the second outer peripheral surface 5, creating a dynamic clamping on the material 1 in strips.

It should be noted that this mutual respective penetration of groove 6 and protruding element 7 defines a sealing operating zone separate from the flat surfaces (facing each other) defined by the first outer peripheral surface 3 and by the second outer peripheral surface 5 and spaced from each other by a value D.

In other words, the zone of minimum tangential distance from one another of the first 3 and second 5 peripheral surfaces is divided into a first non-operating zone (defined by the flat surfaces of the two peripheral surfaces 3 and 5 spaced by a value D) and a second sealing operating zone (limited) defined by the relative penetration between groove 6 and protruding element 7.

Advantageously, the protruding element 7 and the groove 6 have respective geometrical configurations, in cross-section, which are different. In other words, the protruding element 7 and the groove 6 have geometrical shapes which do not mate with each other (that is to say, they are not shaped to be coupled to each other).

Advantageously, the protruding element 7 has a geometrical configuration, in cross-section, which is able to penetrate into the groove 6 by a depth P which is less than the maximum depth of the groove 6.

Therefore, thanks to the penetration of the protruding element 7 in the groove 6 during rotation of the anvil 4 and sonotrode 2, the material 1 in strips is sealed using the axial vibrations FA which propagate along the first axis X2 (see also FIGS. 5 to 10).

As indicated below, if the groove 6 and the protruding element 7 have special geometrical and/or dimensional configurations (for example, inclined walls and/or conveniently large bottom of the groove 6), the radial vibrations FR might also contribute to sealing the material, acting in conjunction with the axial vibrations FA.

The ultrasonic sealing device 100 allows the material 1 in strips to be sealed in a precise and secure fashion thanks to the continuous dynamic clamping effect on the material 1 which allows the formation of a depression on the material 1 in strips passing in the sealing operating zone: this allows a precise control of the sealing in the desired points and zones.

Preferably, the groove 6 has a continuous extension along the first peripheral surface 3. Alternatively, the groove 6 can have a discontinuous extension along the first peripheral surface 3.

In light of this, the groove 6 forms an annular recess around the first peripheral surface 3. The groove 6 extends perpendicularly to the first axis X2.

Preferably, the protruding element 7 has a continuous annular extension around the second peripheral surface 5.

Alternatively, to make discontinuous seals on the material 1 in strips, the protruding element 7 can have a discontinuous annular extension around the second peripheral surface 5. For example, the annular discontinuous extension of the protruding element 7 can be obtained with curved stretches of equal length or different length, which are angularly spaced by the same or different angular distances.

The protruding element 7 extends perpendicularly to the second axis X4.

Preferably, the protruding element 7 is inserted onto the second outside peripheral surface 5. In light of this, the protruding element 7 can be easily and quickly replaced due to wear or size changeover.

Alternatively, the protruding element 7 can be made in one piece, that is, be integral with the second outer peripheral surface 5.

A discontinuous annular extension of the protruding element 7 can be associated with a groove 6 with corresponding discontinuous extension, or a groove 6 with continuous extension.

It should be noted that the protruding element 7 engages partly the groove 6 for a predetermined depth P so as to configure the second sealing operating zone of the material 1 in strips.

In light of this, the depth P configures a height of the second sealing operating zone which is different to the distance D between the peripheral surface 3 or 5 where the groove 6 is formed and the peripheral surface 5 or 3 in which the protruding element 7 is formed (the depth P has a value defined by the configurations and the dimensions of the groove 6 and the protruding element 7).

This difference between distance of the peripheral surfaces 3 and 5 and the depth P determines a positioning side by side of the surface(s) of the groove 6 and the surface(s) of the protruding element 7 designed to allow the use of the axial vibrations for the sealing. The protruding element 7 and the groove 6 have a relative geometrical and dimensional configuration which allows the sonotrode 2 to vibrate axially and radially, that is, according to directions parallel with and perpendicular to the first axis X2, respectively.

Figure 3:
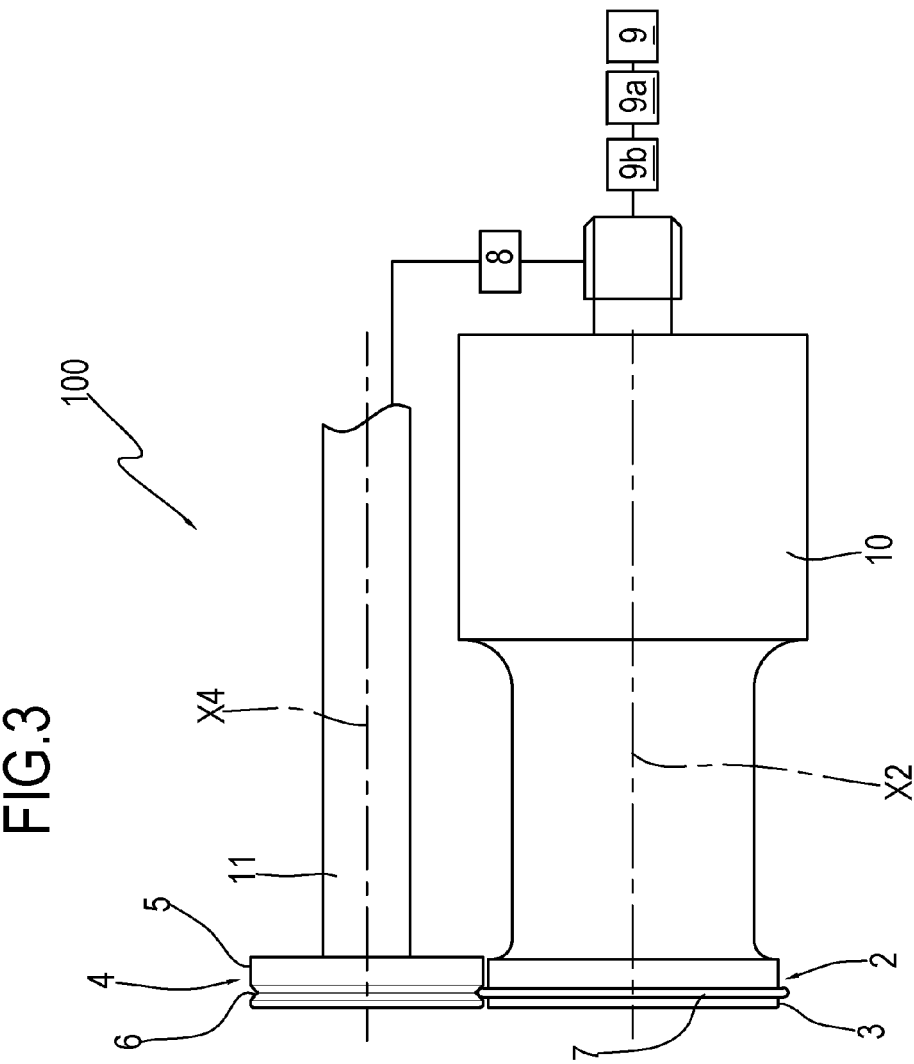
FIG. 3 illustrates a schematic side view, with some parts cut away to better illustrate others, of an ultrasonic sealing device, used in particular on material in the form of strips, according to a second preferred embodiment of the invention.

FIGS. 3 and 4 illustrate a second preferred embodiment of the invention, which differs from the first preferred embodiment illustrated in FIGS. 1 and 2 in that the circular groove 6 is formed on the second peripheral surface 5 (that is, on the anvil 4), whilst the protruding element 7 is associated with the first peripheral surface 3 (that is, with the sonotrode 2).

FIGS. 5 to 10 illustrate further preferred embodiments of the invention, which differ from each other in terms of the shape of the groove 6 and the protruding element 7. Although referred to the first preferred embodiment of FIGS. 1 and 2, that is to say, to the embodiment wherein the groove 6 is associated with the sonotrode 2 and the protruding element 7 is associated with the anvil 4, the embodiments of FIGS. 5-10 can advantageously be applied also to the second preferred embodiment of the invention of FIGS. 3 and 4, wherein the groove 6 is associated with the anvil 4 and the protruding element 7 is associated with the sonotrode 2.

In light of this, the groove 6 comprises a bottom 6a, a first side wall 6b and a second side wall 6c. The groove has an aperture with a width L.

Also in light of this, the protruding element 7 comprises an end head 13, a first flank 130a and a second flank 130b. The end head 13 has width S, smaller than the size L of the aperture of the groove 6, to allow the protruding element 7 to engage partly the groove 6 to the depth P.

In light of this, the protruding element 7 acts in conjunction with one or more, or all three, of the bottom 6a, the first side wall 6b and the second side wall 6c of the groove 6 (see FIGS. 5 to 10) to define one or more sealing operating zones of the material 1 in strips.

As shown in FIGS. 5-10, depending on the relative geometrical and/or dimensional configuration of the protruding element 7 and/or of the groove 6, the sealing operating zone can have a different size, such that they satisfy different operating requirements.

In the description which follows, equal or substantially similar elements are labelled with the same reference numerals.

In the embodiment illustrated in FIG. 5, the groove 6 has a transversal cross-section, or profile, in the shape of a "V" (defined by the side walls 6b and 6c which extend from the bottom 6a defining the vertex of the "V") and the protruding element 7 has transversal cross-section having a side chamfer 12 substantially parallel to the second side wall 6c and a corner 12a, suitably rounded. The side chamfer 12 connects the end head 13 to the second flank 130b. The corner 12a connects the end head 13 to the first flank 130a.

The corner 12a forms a sealing operating zone with relatively reduced size. Alternatively, positioning the side chamfer 12 alongside the second side wall 6c, that is, suitably sizing the protruding element 7 in such a way that the chamfer 12 is positioned alongside the second side wall 6c, it is possible to make a sealing operating zone which is relatively large in size. In other words, the side chamfer 12 can replace, or add to, the corner 12a for sealing the material 1 in strips.

It is therefore clear that, according to the relative geometrical and/or dimensional configuration of the protruding element 7 and the groove 6, only the corner 12a forms a sealing operating zone of relatively reduced size, or only the side chamfer 12 forms a sealing operating zone of relatively large size, or both the corner 12a and the side chamfer 12 form respective sealing operating zones of respective size.

In the embodiment of FIG. 5, mainly the axial vibrations FA and secondarily the radial vibrations FR of the sonotrode 2 act for welding the material 1 in strips.

In the embodiment illustrated in FIG. 6, the groove 6 has a transversal cross-section, or profile, in the shape of a "V" as in the embodiment of FIG. 5 and the protruding element 7 has a transversal cross-section having a corner 12a and a further corner 12b, suitably rounded, forming, in conjunction, respectively, with the first side wall 6b and the second side wall 6c of the groove 6, two distinct sealing operating zones of relatively reduced size.

The further corner 12b connects the end head 13 to the second flank 130b. In short, relative to the embodiment of FIG. 5, the further corner 12b replaces the chamfer 12.

In the embodiment illustrated in FIG. 7, the groove 6 has a transversal cross-section or profile "V" as in the embodiments of FIGS. 5 and 6 and the protruding element 7 has a cross-section which is rounded at the operating head 13.

The operating head 13, in conjunction with the first side wall 6b and the second side wall 6c of the groove 6, forms two distinct sealing operating zones which are larger than the size of the sealing operating zone obtained in the embodiment of FIG. 6. The embodiment of FIG. 7 can advantageously be used for sealing materials 1 in strips of reduced thickness or less resistant and subject to frequent breaks.

Figure 8:
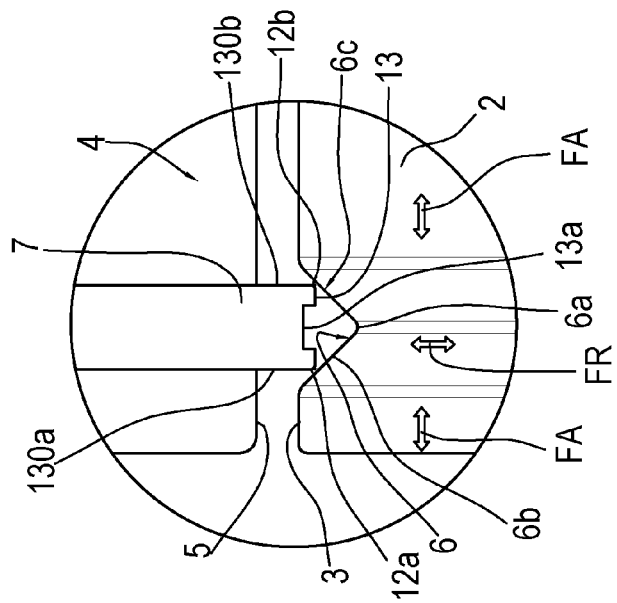

In the embodiment illustrated in FIG. 8, the groove 6 has an irregular transversal cross-section or profile and comprises, as well as a bottom 6a, first side wall 6b and second side wall 6c, a further wall 6d which joins the second side wall 6c to the bottom 6a of the groove 6. Advantageously, in the embodiment illustrated in FIG. 8, the further wall 6d is substantially perpendicular to the first axis of rotation X2. It will be understood that, in alternative embodiments not illustrated, the further wall 6d can have different orientations or, in other words, the further wall 6d can form different angles with respect to the second side wall 6c.

In light of this, the protruding element 7 has a transversal cross-section that is substantially as in the embodiment of FIG. 5, with a corner 12a and a side chamfer 12. The edge 12a forms, in conjunction with the first side wall 6b, a first sealing operating zone which is relatively small in size. The side chamfer 12 is substantially parallel to the second side wall 6c, with which it forms a second sealing zone which is relatively large in size. In practice, the second side wall 6c determines the size of the second sealing operating zone.

Figure 9:
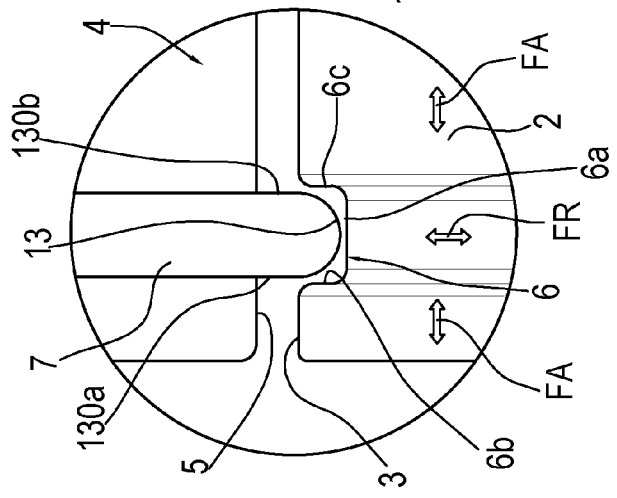

In the embodiment illustrated in FIG. 9, the groove 6 has a transversal cross-section or profile in the shape of a "U", with a flat bottom 6a and a first side wall 6b substantially parallel to a second side wall 6c.

In light of this, the protruding element 7 has a transversal cross-section which is rounded at the operating head 13, substantially as in the embodiment of FIG. 7. The operating head 13, in conjunction with the first side wall 6b and the second side wall 6c of the groove 6, forms two distinct sealing operating zones. The embodiment of FIG. 9 can advantageously be used for sealing materials 1 in strips of reduced thickness or less resistant and subject to frequent breaks.

Again with reference to the embodiment of FIG. 9, by coupling the protruding element 7 conveniently near to the bottom 6a, it is also possible to obtain a third sealing operating zone at the bottom 6a of the groove 6 which uses the radial vibrations FR of the sonotrode 2.

Figure 10:
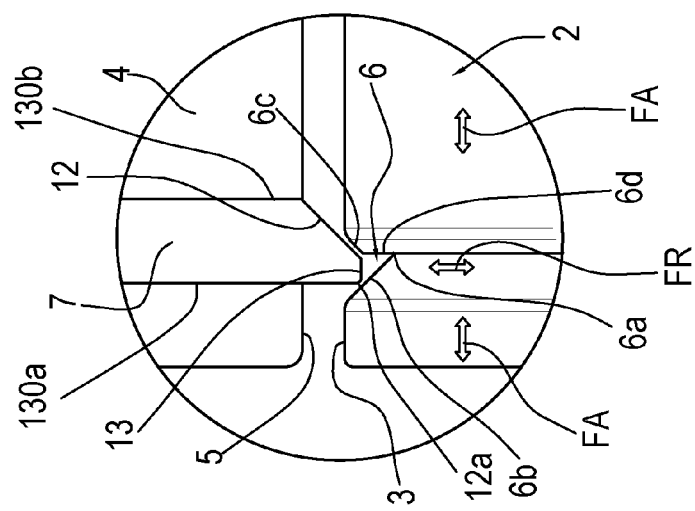

In the embodiment illustrated in FIG. 10, the groove 6 has a transversal cross-section, or profile, in the shape of a "V" as in the embodiments of FIGS. 5-7 and the protruding element 7 has a corner 12a and a further corner 12b, suitably rounded, forming, in conjunction, respectively, with the first side wall 6b and the second side wall 6c of the groove 6, two distinct sealing operating zones of relatively reduced size. The protruding element 7 also has, at the operating head 13, a central groove 13a, which forms with the groove 6 a large working space for the material 1 in strips.

As mentioned, the embodiments illustrated in FIGS. 5-10 can advantageously be applied to both the first preferred embodiment of FIGS. 1 and 2, and to the second preferred embodiment of FIGS. 3 and 4.

Moreover, in alternative embodiments of the invention, combinations, not illustrated, of the groove 6 and the protruding element 7 are possible as illustrated in the embodiments shown in FIGS. 5-10. Merely by way of an example, it is possible to combine the protruding element 7 of FIG. 6 (with two corners suitably rounded) with the U-shaped groove of FIG. 9. In this embodiment, it is possible to use exclusively the axial vibrations FA of the sonotrode 2 if the protruding element 7 is sufficiently far from the bottom 6a of the groove 6; on the contrary, by positioning the protruding element 7 conveniently near to the bottom 6a of the groove 6 it is possible to also use the radial vibrations FR.

According to further alternative embodiments of the invention, not illustrated, it is possible to modify the profiles of the groove and protruding element with respect to those illustrated in FIGS. 5-10. For example, it is possible to shape the protruding element 7 with a first side chamfer and a second side chamfer, designed in such a way that each operates in conjunction with a respective side wall of the groove. In a further alternative embodiment of the invention, not illustrated, the side chamfer 12 can be made on a protruding element 7 with a transversal cross-section which is rounded at the operating head 13 (of the type shown in FIGS. 7 and 9).

Moreover, the groove 6 can have a transversal cross-section, or profile, which is curved or substantially semicircular and can advantageously be coupled to any one of the protruding elements described above. In light of this, a groove with a semicircular transversal cross-section, or profile, can be advantageously coupled to a protruding element with a corresponding rounded or semicircular transversal cross-section, of the type shown in FIGS. 7 and 9, thus using fully the axial vibrations FA and the radial vibrations FR and obtaining a maximum use of the power supplied to the sonotrode.

This invention provides a method for sealing a strip of material 1 (thermoplastic) using the sealing device described above.

The method comprises the following steps:
feeding a strip of material 1 to be sealed along the above-mentioned direction A to engage (interpose), with a portion of it to be sealed, the groove 6 and the protruding element 7;
transmitting axial vibrations to the rotary sonotrode 2 to axially vibrate, along directions parallel to the first and second axis X2, X4, the groove 6 or the protruding element 7 in such a way as to seal the portion to be sealed of the strip 1 by a vibrating contact between the portion to be sealed and the groove 6 and the protruding element 7.

Preferably, during the feeding step, the portion of strip 1 to be sealed engages with at least a side surface of the groove 6 and interposes on a section or surface of the protruding element.

Alternatively, during the feeding step, the portion of strip 1 to be sealed engages with at least two surfaces (also adjacent) forming the groove 6 and interposes on two distinct sections or portions forming the protruding element 7.

Alternatively, again, during the feeding step, the portion of strip 1 to be sealed engages two surfaces and a bottom forming the groove 6.

The invention makes it possible to achieve various advantages compared with the prior art devices:
greater use of the energy supplied to the sonotrode, that is, use of the axial vibrations, as well as the radial vibrations;
precise control and saving of energy needed for operation of the device;

better quality of the sealing as it is it possible to make use of a precise and stable positioning of the material in the sealing zone combined with a high capacity and speed of sealing of the material in the desired point or zone;

eliminating friction between sealing device and material to be sealed and, therefore, overcoming problems for feeding the material and preventing formation of creases on the material.

The invention claimed is:

1. An ultrasonic sealing device, comprising:
   an electrical signal generator (9);
   a converter (9a) for converting the electrical signals into mechanical vibrations;
   a sonotrode (2) rotating about a first axis (X2) and having a first peripheral surface (3); and
   an anvil (4) rotating about a second axis (X4) parallel to the first axis (X2) and having a second peripheral surface (5);
   characterised in that:
   one between the first peripheral surface (3) and the second peripheral surface (5) has a circular groove (6); and
   one between the second peripheral surface (5) and the first peripheral surface (3), respectively, has a protruding element (7) which is annular in shape; the protruding element (7) being configured to engage the groove (6) for a predetermined depth (P) and operating in conjunction at least axially along directions parallel to the first axis (X2) and to the second axis (X4) with the groove (6), in such a way as to seal a material (1) to be sealed, the material being moved along a direction (A) transversal to the first (X2) and second (X4) axis and passing between the sonotrode (2) and the anvil (4) engaging the groove (6) and the protruding element (7), and wherein the protruding element (7) and the groove (6) have respective geometrical configurations, in cross-section, which are different, and wherein the protruding element (7) has a geometrical configuration, in cross-section, which is able to penetrate into the groove (6) by the depth (P) which is less than the maximum depth of the groove (6).

2. The ultrasonic sealing device according to claim 1, wherein the groove (6) is continuous.

3. The ultrasonic sealing device according to claim 1, wherein the protruding element (7) is continuous.

4. The ultrasonic sealing device according to claim 1, wherein the protruding element (7) is discontinuous.

5. The ultrasonic sealing device according to claim 4, wherein the groove (6) is discontinuous.

6. The ultrasonic sealing device according to claim 1, wherein the groove (6) has an aperture with a width L and the protruding element (7) has an operating head (13) with a width S less than the width L of the aperture of the groove (6).

7. The ultrasonic sealing device according to claim 1, wherein the protruding element (7) is inserted onto the first (3) or second (5) peripheral surface.

8. The ultrasonic sealing device according to claim 1, wherein the protruding element (7) is integral with the first (3) or second (5) peripheral surface.

9. The ultrasonic sealing device according to claim 1, wherein the groove (6) has a transversal cross-section, or profile, in the shape of a "V", or in the shape of a "U", or with a curved shape.

10. The ultrasonic sealing device according to claim 1, wherein the first peripheral surface (3) of the sonotrode (2) has the protruding element (7) and the second peripheral surface (5) of the anvil (4) has the groove (6).

11. The ultrasonic sealing device according to claim 1, wherein the first peripheral surface (3) of the sonotrode (2) has the groove (6) and the second peripheral surface (5) of the anvil (4) has the protruding element (7).

12. A method for sealing a strip of material (1) using the sealing device according to claim 1, the method comprising the following steps:
   feeding a strip of material (1) to be sealed along the direction (A) to engage, with a portion of it to be sealed, the groove (6) and the protruding element (7);
   transmitting axial vibrations to the rotary sonotrode (2) to axially vibrate, along directions parallel to the first and second axis (X2, X4), the groove 6 or the protruding element (7) in such a way as to seal the portion to be sealed of the strip (1) by a vibrating contact between the portion to be sealed and the groove (6) and the protruding element (7).

* * * * *